United States Patent
Horita

(10) Patent No.: US 7,493,580 B2
(45) Date of Patent: Feb. 17, 2009

(54) CRITICAL PATH ESTIMATING PROGRAM, ESTIMATING APPARATUS, ESTIMATING METHOD, AND INTEGRATED CIRCUIT DESIGNING PROGRAM

(75) Inventor: Keisuke Horita, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 80 days.

(21) Appl. No.: 11/468,900

(22) Filed: Aug. 31, 2006

(65) Prior Publication Data

US 2007/0204247 A1 Aug. 30, 2007

(30) Foreign Application Priority Data

Feb. 24, 2006 (JP) ............... 2006-049347

(51) Int. Cl.
G06F 17/50 (2006.01)
(52) U.S. Cl. .......................................... 716/6; 703/16
(58) Field of Classification Search ...................... 716/6, 716/10; 703/16
See application file for complete search history.

(56) References Cited

U.S. PATENT DOCUMENTS

| | | | | |
|---|---|---|---|---|
| 6,058,252 | A * | 5/2000 | Noll et al. ....................... | 716/10 |
| 6,324,678 | B1 * | 11/2001 | Dangelo et al. ............... | 716/18 |
| 6,412,096 | B1 * | 6/2002 | Ventrone ........................ | 716/2 |
| 6,427,226 | B1 * | 7/2002 | Mallick et al. ................. | 716/10 |
| 6,539,536 | B1 * | 3/2003 | Singh et al. ................... | 716/18 |
| 6,952,812 | B2 * | 10/2005 | Abadir et al. .................. | 716/4 |
| 7,246,340 | B1 * | 7/2007 | Van Antwerpen et al. ..... | 716/18 |
| 7,350,173 | B1 * | 3/2008 | Ang et al. ...................... | 716/8 |
| 7,363,599 | B1 * | 4/2008 | Vogenthaler .................. | 716/2 |
| 2002/0112213 | A1 * | 8/2002 | Abadir et al. .................. | 716/4 |
| 2003/0163797 | A1 * | 8/2003 | Stenberg et al. ............... | 716/13 |
| 2004/0019473 | A1 * | 1/2004 | Burden et al. ................. | 703/14 |
| 2004/0088663 | A1 * | 5/2004 | Wu et al. ........................ | 716/6 |
| 2005/0076319 | A1 * | 4/2005 | Chow et al. .................... | 716/10 |
| 2005/0235177 | A1 * | 10/2005 | Ohara et al. ................... | 714/700 |
| 2005/0273743 | A1 * | 12/2005 | Ikeda ............................ | 716/10 |
| 2006/0150129 | A1 * | 7/2006 | Chiu et al. ..................... | 716/4 |
| 2006/0277019 | A1 * | 12/2006 | Ganesan et al. ............... | 703/14 |
| 2007/0074138 | A1 * | 3/2007 | Homma et al. ................. | 716/6 |
| 2007/0094625 | A1 * | 4/2007 | Ikeda ............................ | 716/5 |
| 2007/0150846 | A1 * | 6/2007 | Furnish et al. ................. | 716/8 |
| 2008/0163149 | A1 * | 7/2008 | Curtin et al. ................... | 716/8 |
| 2008/0201678 | A1 * | 8/2008 | Ang et al. ...................... | 716/8 |

FOREIGN PATENT DOCUMENTS

JP 06-215061 8/1994

* cited by examiner

*Primary Examiner*—Phallaka Kik
(74) *Attorney, Agent, or Firm*—Staas & Halsey LLP

(57) ABSTRACT

A computer-readable recording medium on which is recorded a program, which is used by a computer for estimating a critical path among a plurality of paths given as paths within an integrated circuit, for causing the computer to execute a process, the process comprising receiving from a memory inputs of a logic description for the integrated circuit, and the plurality of given paths, obtaining a path evaluation value, which represents a delay of a path, for each of the given paths, and prioritizing the paths according to evaluation values, and estimating a path having a large evaluation value as the critical path.

11 Claims, 16 Drawing Sheets

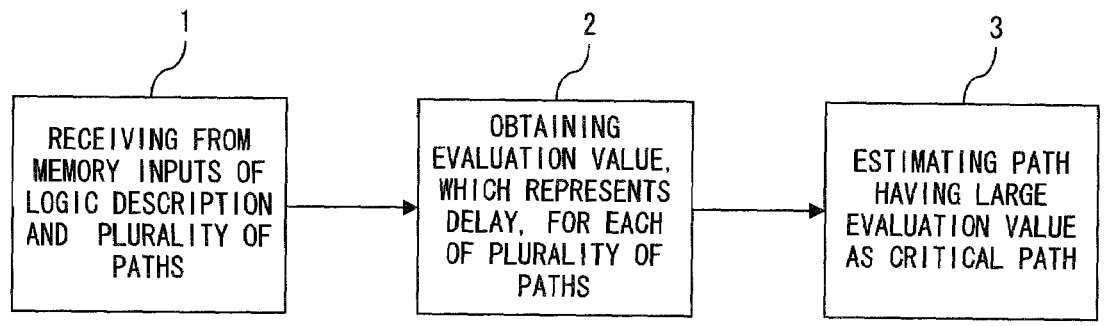
F I G. 1

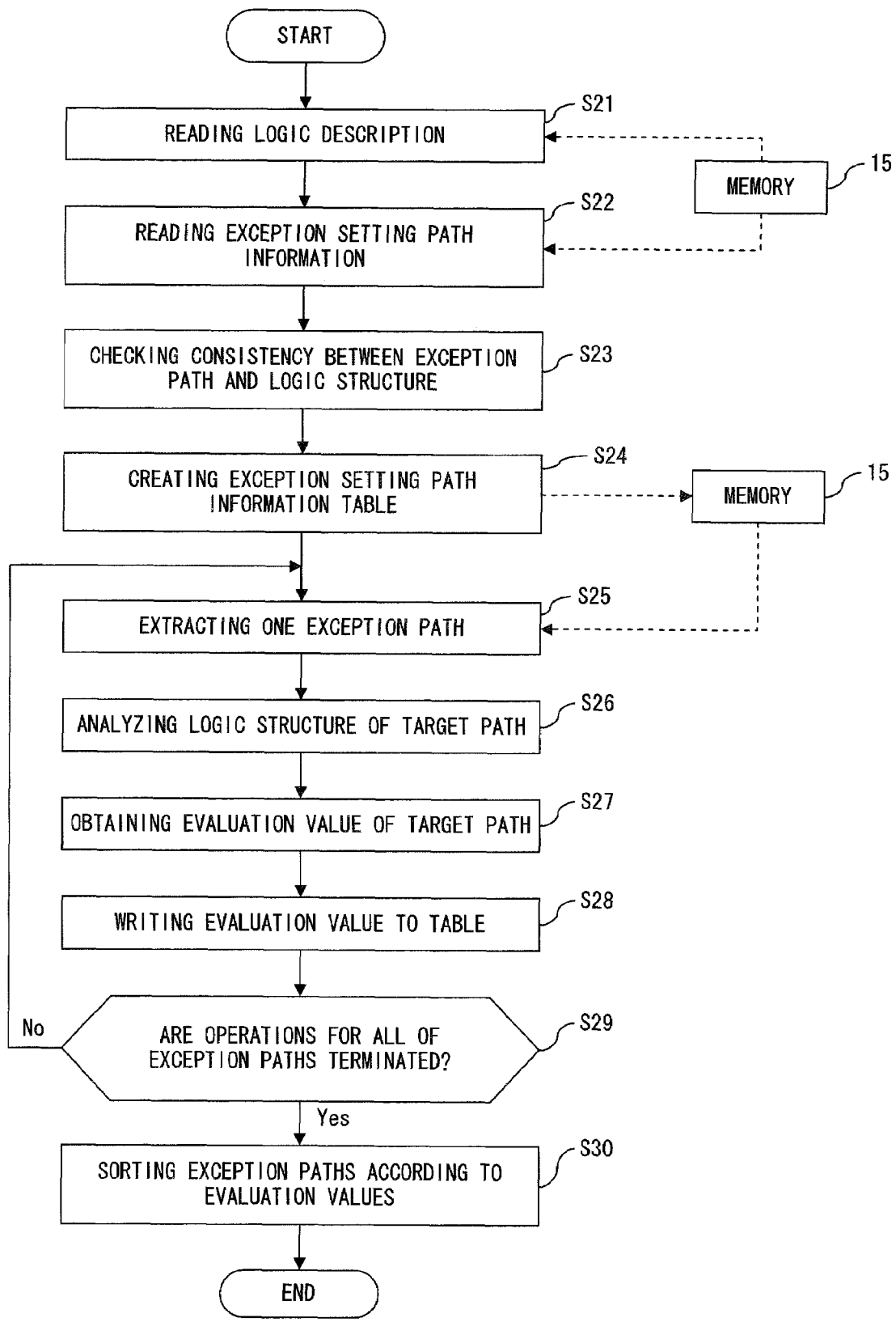
F I G. 4

```
create_clock -name "CLK1" -period 4630 -waveform {0 2315} [get_ports
{CLK_1}]]
create_generated_clock -name "M6CLK" -source [get_ports {M12CLK}]
-divide_by 2 [
get_pins {CLKGEN/m_SELM6CLK/m_BOR/Y}]

set_case_analysis 1 [get_pins {m_HTSTBUF/m_BUF/Y}]

set_input_delay 5000 -max -clock "M6CLK" [get_ports {XRESET}]
set_input_delay 5000 -max -clock "M6CLK" [get_ports {DATAIN}]

set_output_delay 5000 -clock "M6CLK" [get_ports {PESD}]
set_output_delay 5000 -clock "M6CLK" [get_ports {TSD!}]

set_false_path¥
        -from    [list [get_ports {AMODE[7]}]¥
                 [get_ports {BMODE[6]}]¥ ]

set_false_path¥
        -from    [get_ports {XRESET}]

set_false_path¥
        -from    [get_pins {TOP/E_reg_1_/CLK}]¥
        -to      [list [get_pins {TOP//NT/I_reg_7_/DATA}]¥
                 [get_pins {TOP/DEC/NT/MBAI_reg_9_/DATA}]¥
                 [get_pins {TOP/DEC/NT/MBAI_reg_8_/DATA}]¥ set_multicycle_path 12 - setup¥
        -from   [get_clocks {CLK1}]¥
        -to     [get_clocks {M12CLK}]
```

F I G. 5

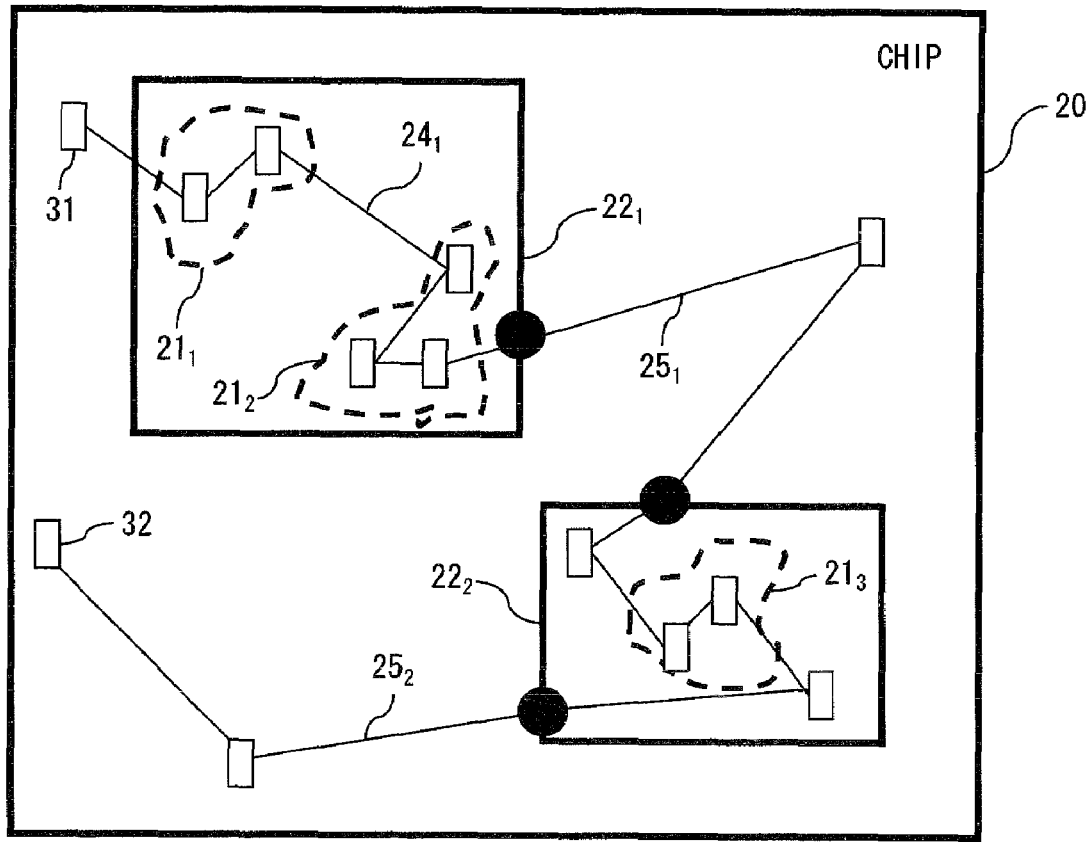
21 : LOGIC MODULE
22 : PHYSICAL LAYER
24 : WIRE BETWEEN LOGIC MODULES
25 : WIRE BETWEEN PHYSICAL LAYERS
F I G. 6

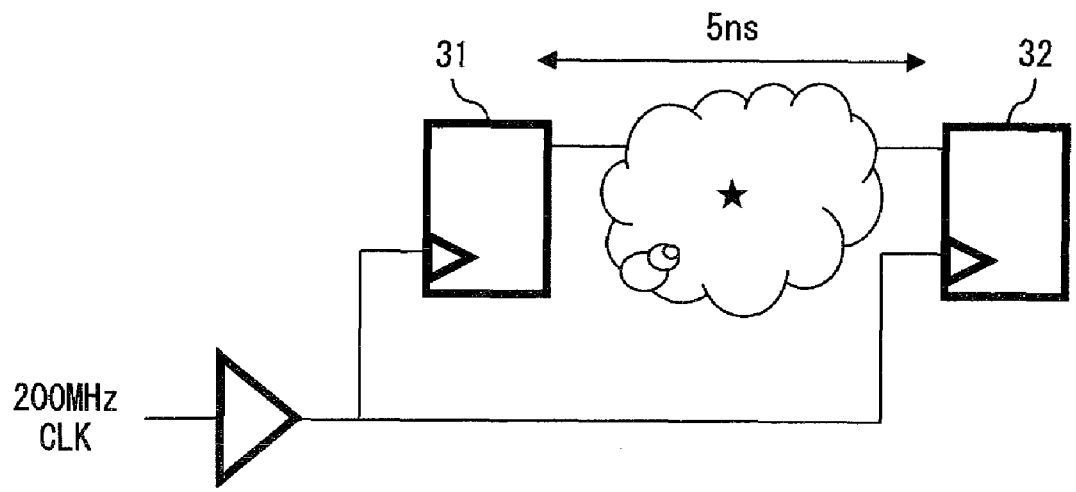
F I G. 1 3 A
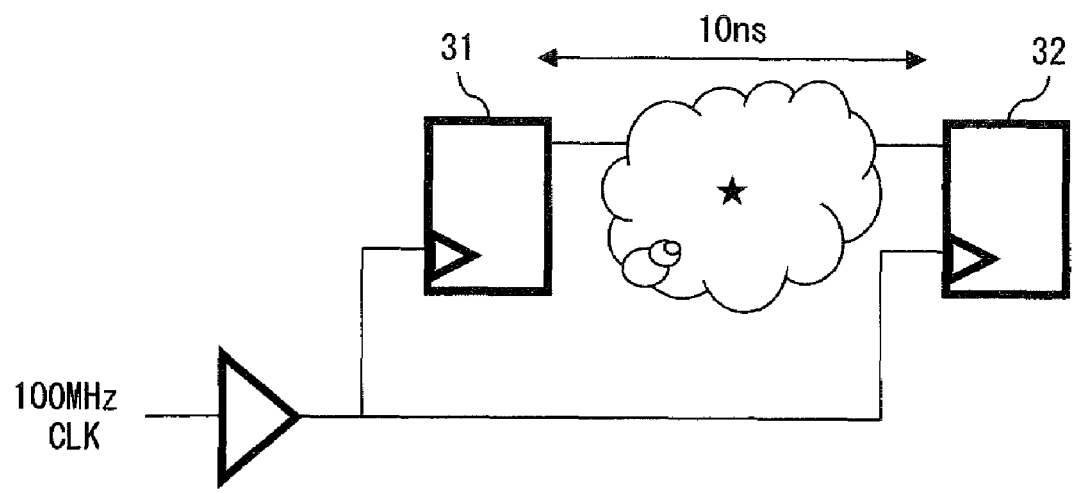
F I G. 1 3 B

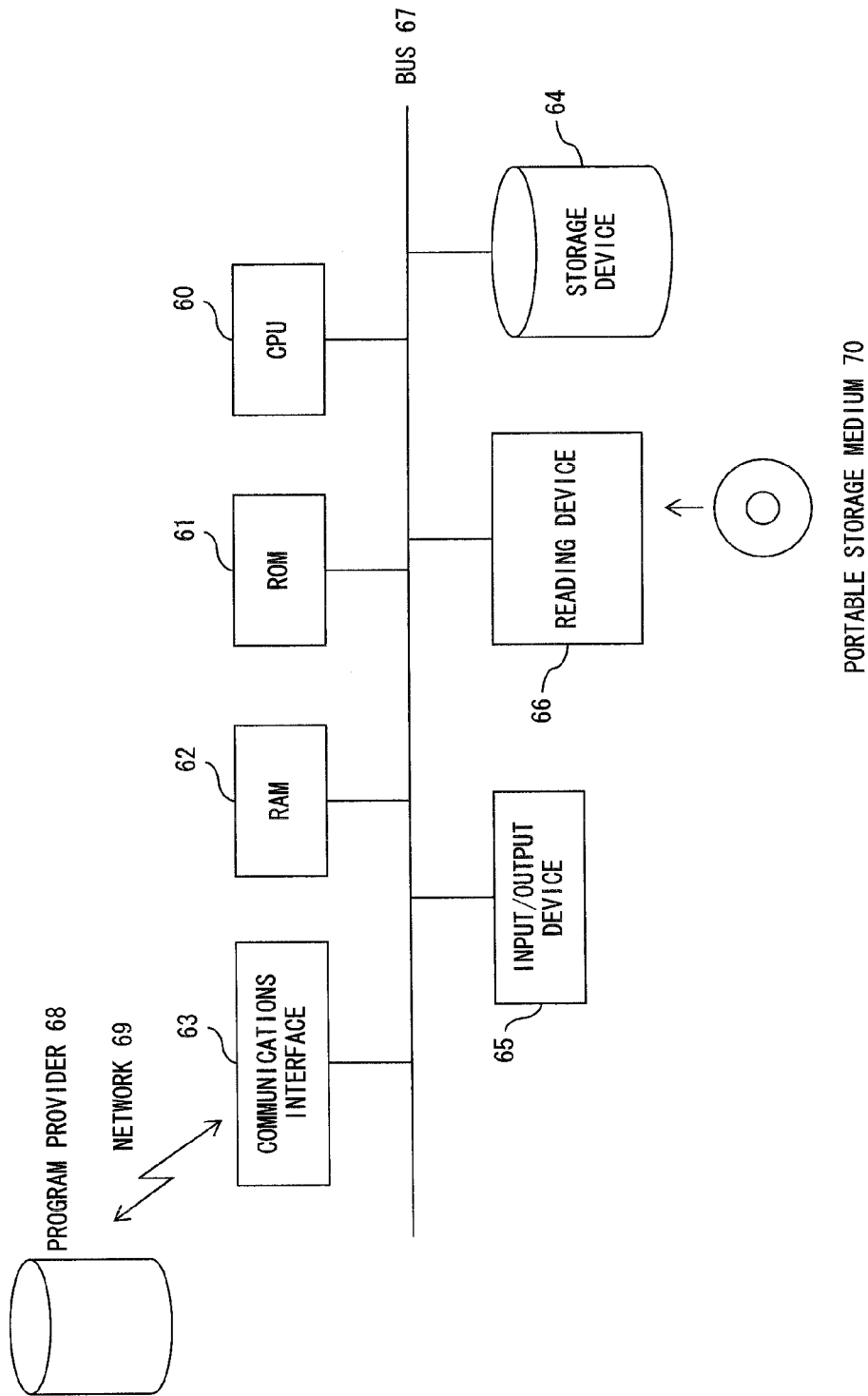
F I G. 16

US 7,493,580 B2

CRITICAL PATH ESTIMATING PROGRAM, ESTIMATING APPARATUS, ESTIMATING METHOD, AND INTEGRATED CIRCUIT DESIGNING PROGRAM

CROSS-REFERENCE TO RELATED APPLICATIONS

This application is based upon and claims the benefit of priority from the prior Japanese Patent Application No. 2006-049347 filed on Feb. 24, 2006, the entire contents of which are incorporated herein by reference.

BACKGROUND OF THE INVENTION

1. Field of the Invention

The present invention relates to a designing method for a large-scale integrated circuit such as a system LSI, etc., and more particularly, to a critical path estimating method for making a layout process efficient by excluding an exception path, which is estimated to be a critical path having a severe timing condition, among exception paths having no possibilities of being used in the operations of an actual circuit instead of making a timing analysis by targeting all of paths between arbitrary two memory elements within an integrated circuit in a static timing analysis.

2. Description of the Related Art

Generally, in a design of an integrated circuit such as a system LSI, first as a functional design from system specification, an operation description, for example, in C language is obtained, logic synthesis of a bottom-up technique for creating, by way of example, a net list as a description of a logic level, for example, is made, for example, via a register transfer level (RTL) description, and a layout design process as a determination of arrangement and wiring is executed thereafter.

In a layout design process, a static timing analysis (STA) for making timing verification by targeting all of paths between arbitrary two memory elements within an LSI is made in correspondence with an actual wire load. With the STA, the timing verification which targets all of paths between arbitrary two memory elements within an LSI is made. However, since the timing verification is made also for exception paths having no possibilities of being actually used within the circuit among the paths, the processing amount of the timing verification becomes enormous as the circuit scale of the LSI increases.

As one of file formats of various types of setting condition data for the timing verification, a synopsis design constraint (SDC) is widespread. In recent years, a tool for automatically extracting exception paths within an LSI has been used to shorten the turn around time (TAT) of LSI design. However, the number of exception paths extracted with such an SDC automatic generation tool tends to become enormous with an increase in the scale of a circuit.

Originally, the efficiency of a layout process significantly increases if the layout process can be executed by excluding exception paths extracted with such a tool. However, there are problems such that even a memory amount itself for storing the data of exception paths cannot be prepared when the scale of a circuit is large, and that a processing amount for excluding numerous exception paths from targets of the timing verification becomes enormous even if the data of exception paths can be stored in a memory, and extraction results of the SDC automatic generation tool cannot be used effectively. Accordingly, there is a conventional problem such that extraction results of the SDC automatic generation tool can be used only as a comparison material in the evaluation of critical paths in STA corresponding to a layout process even if exception paths are automatically extracted with such a tool, and this is not helpful for making a layout process efficient.

Additionally, as a conventional technique for using SDC, there is also a method for creating SDC by making STA based on a tentative wire load, for example, a wire load model (WLM) before a layout. This method, however, poses a problem that design processing procedures become cumbersome.

Japanese Patent Application Publication No. HEI6-215061, as such a conventional technique for extracting critical paths within an LSI, discloses a technique, which assumes a gate level simulation and extracts critical paths by targeting a simulation execution range interactively specified with GUI in an initial design stage of an LSI. Even this conventional technique cannot solve the problem such that handling of all of paths extracted, for example, with an SDC automatic generation tool as exception paths hinders a layout process from being efficient.

SUMMARY OF THE INVENTION

It is an object of the present invention to enable a path having a large evaluation value to be estimated as a critical path by calculating the evaluation value of a path, which indicates a delay for the path between two memory elements within an integrated circuit, based on a logic description corresponding to the integrated circuit, and to make a layout process efficient by using a path having a large evaluation value as an exception path for the layout process among paths extracted, for example, with an SDC automatic generation tool.

A computer-readable recording medium according to the present invention is a computer-readable recording medium on which is recorded a program, which is used by a computer for estimating a critical path among a plurality of paths given as paths within an integrated circuit, causing the computer to execute a process, the process comprising: receiving from a memory inputs of a logic description for the integrated circuit, and the plurality of given paths; obtaining a path evaluation value, which represents a delay of a path, for each of the given paths; prioritizing the paths according to evaluation values, and estimating a path having a large evaluation value as the critical path.

According to the present invention, only a path having a large evaluation value, which represents a delay, can be estimated as a critical path among numerous exception paths extracted, for example, with an SDC automatic generation tool, whereby an exception path to be used, by way of example, for a layout process can be narrowed down.

BRIEF DESCRIPTION OF THE DRAWINGS

FIG. 1 is a functional block diagram showing the principle of a critical path estimating program according to the present invention;

FIG. 4 is a flowchart showing the details of a critical path candidate extraction process;

FIG. 5 shows an example of results extracted with an SDC automatic generation tool;

FIG. 6 is a schematic explaining physical layers and logic modules on an LSI;

FIG. 13A is a schematic explaining the consideration of a clock frequency in wire-considered logic stage number evaluation;

FIG. 13B is a schematic explaining the consideration of a clock frequency in wire-considered logic stage number evaluation;

FIG. 16 is a schematic explaining the loading of a program in a preferred embodiment into a computer.

DESCRIPTION OF THE PREFERRED EMBODIMENTS

FIG. 1 is a functional block diagram showing the principle of a critical path estimating program according to the present invention. This figure shows a program used by a computer for estimating a critical path among paths given as paths within an integrated circuit, for example, exception paths.

In FIG. 1, a procedure for receiving from a memory inputs of a logic description for an integrated circuit, and a plurality of given paths, a procedure for obtaining a path evaluation value, which represents a delay of a path, for each of the plurality of given paths, and a procedure for prioritizing the paths according to evaluation values, and for estimating a path having a large evaluation value as a critical path are executed by the computer respectively in 1, 2, and 3.

An integrated circuit designing program according to the present invention uses a critical path estimating program the principle of which is shown in FIG. 1. This program further causes the computer to execute a process, the process comprising: giving paths extracted as exception paths within an integrated circuit as the plurality of given paths; and handling only a path, which is estimated as the above described critical path, as an exception path among the extracted exceptional paths, and making a layout of the integrated circuit.

A critical path estimating apparatus according to the present invention is an apparatus for estimating a critical path among a plurality of paths given as paths within an integrated circuit. This apparatus comprises: an inputting unit for receiving from a memory inputs of a logic description for the integrated circuit, and the plurality of given paths; an evaluation value calculating unit for obtaining a path evaluation value, which represents a delay of a path, for each of the plurality of given paths; and a prioritizing/processing unit for prioritizing the paths according to evaluation values, and for estimating a path having a large evaluation value as the critical path. As described above, according to the present invention, only a path having a large evaluation value, which represents a delay of a path, is estimated as a critical path among a plurality of given paths such as exception paths, which are extracted, for example, with an SDC generation tool, within an integrated circuit.

Figure 2:
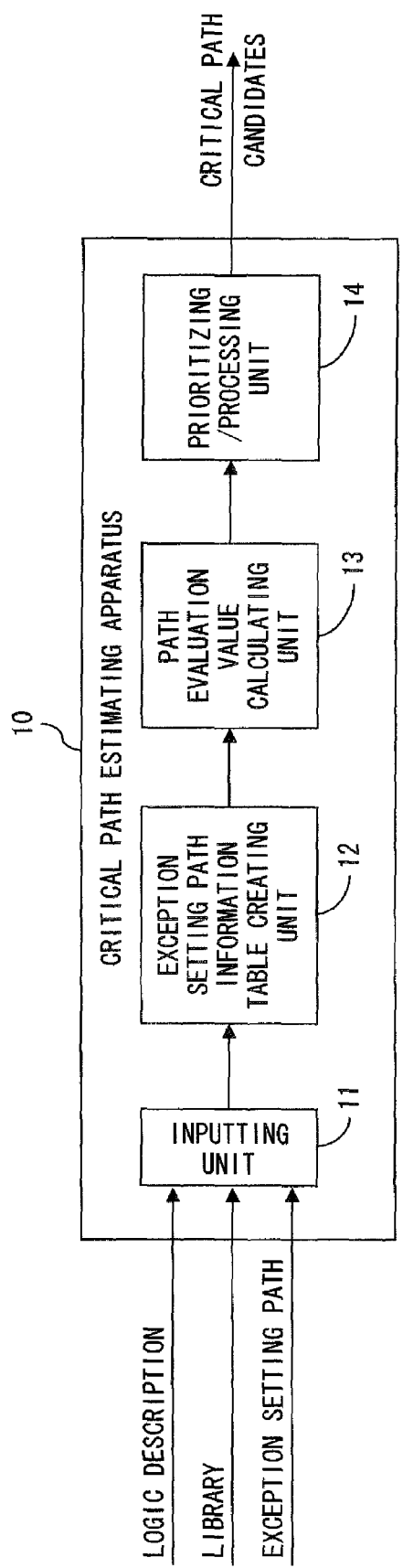
FIG. 2 is a block diagram showing a basic configuration of a critical path estimating apparatus.

FIG. 2 is a block diagram showing the basic configuration of the critical path estimating apparatus for executing a critical path estimating method according to the present invention. In this figure, data of a logic description corresponding to a system LSI to be designed and a library, and exception setting path information extracted with an SDC (Synopsis Design Constraint) automatic generation tool are input to the critical path estimating apparatus 10, whereas critical path candidates left as targets of a timing analysis in a static timing analysis (STA) among exception paths extracted with the SDC automatic generation tool are output from the critical path estimating apparatus 10. These candidates are prioritized in descending order of severity of timing, and narrowed down. As a result, an exception path, the timing closure of which is easy and the process of which is relatively simple, among exception paths automatically extracted with the SDC automatic generation tool is handled not as an exception path in a layout process or STA but as a target path in the timing analysis, whereby only a critical path candidate having severe timing is narrowed down as an exception path from among numerous paths extracted with the SDC automatic generation tool, and can be handled in the layout or the STA.

In FIG. 2, the critical path estimating apparatus 10 comprises an inputting unit 11 for receiving inputs of a logical description, data of a library, exception setting path information, etc., an exception setting path information table creating unit 12 for verifying a logic structure and consistency of an exception setting path based on these input data, and for creating a table for storing information of an exception setting path the consistency of which is verified, a path evaluation value calculating unit 13 for obtaining an evaluation value, which indicates a delay of a path corresponding to the information of the exception setting path information stored in the table, and a prioritizing/processing unit 14 for prioritizing exception paths in descending order of path evaluation values after the path evaluation values for the exception paths stored in the exception setting path information table are calculated, and for outputting exception paths having high priorities among the prioritized exception path data as critical path candidates.

Figure 3:
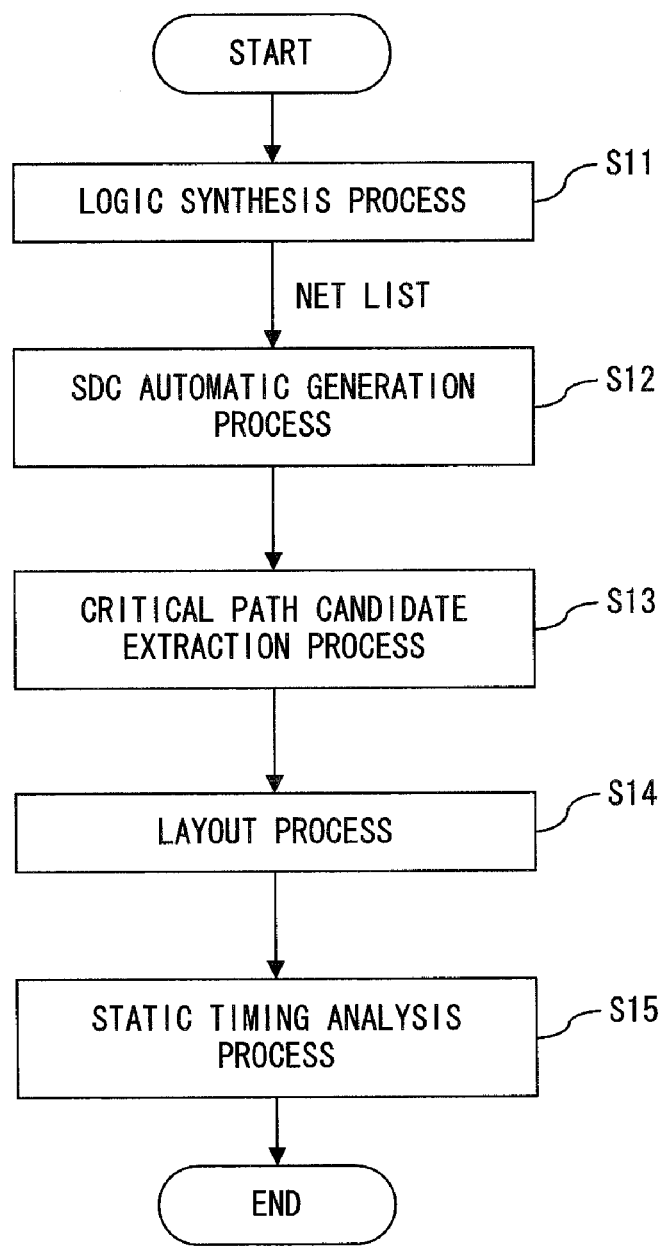
FIG. 3 is a flowchart showing the whole of a system LSI design process.

FIG. 3 is a flowchart showing the whole of an LSI design process in a preferred embodiment. Once the process is started in this figure, a logic synthesis process is initially executed in step S11. As a result, for example, a net list is output, and an SDC automatic generation process for extracting an exception setting path is executed in step S12. As described above, in the exception setting path extraction process using the SDC automatic generation process, the number of exception paths automatically extracted is very large, and the automatically extracted exception setting paths cannot be used for a layout process unchanged.

For this reason, in the present invention, the extraction of a critical path candidate having severe timing among the exception paths extracted with the SDC automatic generation tool is made with a critical path candidate extraction process in step S13, and only the critical path candidate is handled as an exception path in a layout process in step 14 and a static timing analysis (STA) process in step S15, which will be executed later, whereby part of the results of the exception paths extracted with the SDC automatic generation tool can be used, leading to the speedup of the closure of the layout process.

FIG. 4 is a flowchart showing the details of the critical path candidate extraction process in step S13 of FIG. 3. Once the process is started in this figure, for example, a net list is initially read from a memory 15 as a logic description for a system LSI to be designed in step S21. As the logic description, for example, an RTL (Register Transfer Level) description or a description in C language may be used as a matter of course.

Then, in step S22, exception setting path information, namely, information of exception paths extracted with the SDC automatic generation tool is read. In step S23, consistency between an exception path and a logic structure is verified to exclude an impossible exception path from the viewpoint of a logic structure. In step S24, an exception setting path information table that stores the data of the exception setting path the consistency of which is verified is created within the memory.

Then, in steps S25 to S29, timings of exception paths, generally, numerous exception paths, which are extracted with the SDC automatic generation tool and whose consistency with the logic structure is verified, are evaluated by targeting the exception paths, and their evaluation values are calculated to prioritize the exception paths in descending order of severity of the timings. In this preferred embodiment, a wire-considered logic stage number evaluation value, which is obtained by evaluating timing including the numbers of wires and fan-outs based on the number of stages of gates included within a path, is assumed to be used as the evaluation value.

Firstly, in step S25, one exception path is extracted as a determination target. In step S26, the logic structure of the exception path is analyzed. In step S27, the wire-considered logic stage number evaluation value of the target path is calculated. Then, in step S28, the evaluation value is written to the target path within the exception setting path information table created within the memory 15 in step S24. In step S29, whether or not the operations for all of the exception setting paths are terminated is determined. If the operations are not terminated for all of the exception setting paths, the operations in and after step S25 are repeated for all of the exception paths stored in the exception setting path information table. Upon termination of the operations for all of the exception paths, the exception paths are sorted in descending order of wire-considered logic stage number evaluation values, and results of the prioritization of the exception setting paths are obtained in step S30. According to these results, a layout process is executed by handling only exception paths having high priorities as exception paths, although this depends on the ability of a layout tool.

FIG. 5 shows an example of SDC (Synopsis Design Constraint). Exception settings such as "false path" and "multicycle path" are extracted with the SDC automatic generation tool in step S12 of FIG. 3. With timing analysis, for example, a static timing analysis, a path from one memory element such as a flip-flop within an LSI to another memory element such as a random access memory is extracted for all of memory elements within the LSI, and their timing analysis is made. With this timing analysis, the frequency and the waveform of a clock are set. Then, for example, mode settings for an internal selector, namely, specification of selection of an input terminal, and the like are made as a case analysis.

Additionally, for example, as exception paths having(?) a problematic delay from an external memory element of a chip to an external memory element of the chip via a path within the chip, the value of an input delay from the external memory element to an input port of the chip, and that of an output delay from an output port of the chip to the external memory element are set, and exception paths (such as false path or multicycle path) are extracted for these setting results.

A calculation of an evaluation value for an exception path which is extracted with the SDC automatic generation tool and whose consistency with a logic structure is verified is described next with reference to FIGS. 6 to 10. As described above, this evaluation value is based on the number of stages of gates included within a path. However, a delay of a wire, for example, between gates must be considered rather than a delay of a gate itself, since the sub-100 nm era has come and an LSI process becomes finer. Therefore, a wire-considered logic stage number evaluation value, which corresponds to the number of stages of gates and a delay by a wire, is first described to evaluate also a delay of a wire, for example, between logic modules.

FIG. 6 shows an example of arrangement of gates and modules on a chip. The gates and the flip-flops, which are represented by vertically long rectangles, are arranged on the chip 20, and wires are laid down between the gates and the flip-flops. The wire-considered logic stage number evaluation value is obtained by including a delay by a wire between the logic modules 21 enclosed with dotted lines among the gates, and a delay by a wire between physical layers 22 generally including a plurality of logic modules. Here, the physical layers 22 are layers of a scale, which can be automatically laid out with a process once executed, although this depends on the processing ability of a design tool. In a complicated system LSI, a plurality of physical layers are arranged on the chip 20 to finally make a layout. The logic modules are arranged within a short distance range on a physical layer in the automatic layout of the physical layer. Accordingly, a delay by a wire 25 between physical layers normally becomes larger than that by a wire 24 between logic modules. In this preferred embodiment, the delays by both of the wires are considered in the calculation of an evaluation value.

Figure 7:
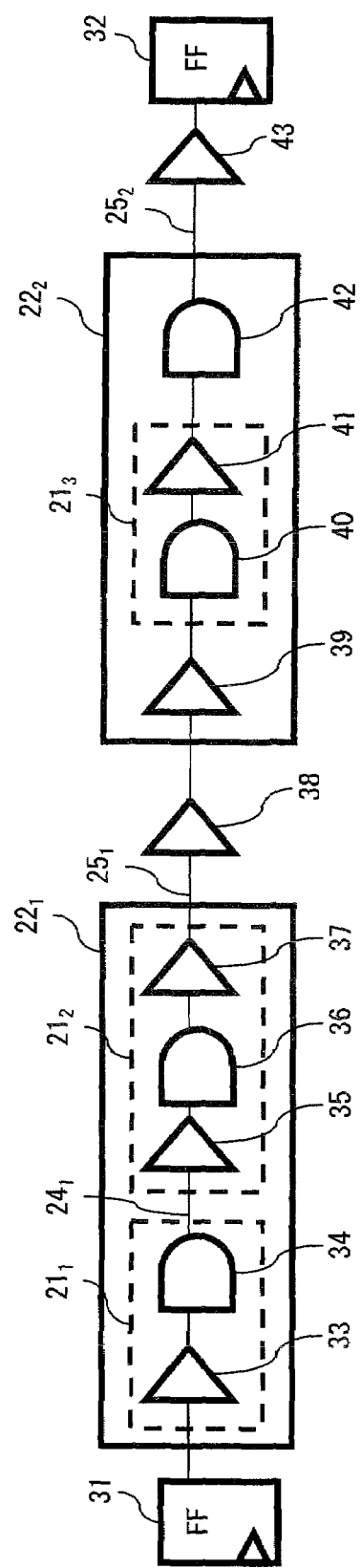
FIG. 7 shows an example of a path between two memory elements on an LSI.

FIG. 7 is a schematic showing the path on the chip 20 shown in FIG. 6, which is developed in the horizontal direction. This figure assumes that the logic elements configuring the path are converted into basic gates to evaluate their number of stages. Namely, FIG. 7 is a schematic showing the developed path from the FF 31 corresponding to the leftmost rectangle on the chip 20 in FIG. 6 to the FF 32 corresponding to a rectangle under the FF 31.

In FIG. 7, the path between the two FFs 31 and 32 includes 11 gates 33 to 43 in conversion into basic gates, and the number of logic stages of the gates within the path is 11. The number of wires between logic modules is only one wire $24_1$ between the logic modules $21_1$ and $21_2$. However, also delays such as a delay by a wire between a gate 39 and a logic module $21_3$ cannot be ignored. Additionally, as wires between physical layers, a wire $25_1$ between gates 37 and 38, and a wire $25_2$ between gates 42 and 43 are shown in FIG. 7. However, for example, also a delay by a wire between the FF 31 and the physical layer $22_1$, namely, the wire between the FF 31 and the gate 33 cannot be ignored. For ease of explanation, in this preferred embodiment, a wire-considered logic stage number evaluation value is obtained by assuming that the number of wires between logic modules matches that of logic modules included in a path, and also the number of wires between physical layers matches that of physical layers included in the path.

In this preferred embodiment, the wire-considered logic stage number evaluation value is basically calculated with the following expression.

(number of wires between logic modules M×coefficient Km)+(number of wires between physical layers N×coefficient Kn)+number of stages of basic logic gates Gate Num (1)

where the coefficient Km for a wire between logic modules is equivalent to a delay by a wire between logic modules, Kn is a coefficient in conversion into a logic stage number of a delay by a wire between physical layers, and Gate Num is the number of basic gates included in a path. Assuming that the values of Km and Kn are 1.2 and 2.8 respectively, the wire-considered logic stage number evaluation value of the path from the FF 31 to the FF 32 in FIG. 7 results in 20.2 since this path includes two physical layers, three logic modules, and 11 basic gates.

This preferred embodiment explains the simple evaluation expression in the case where the number of logic modules and the number of wires between the logic modules are the same, and the number of physical layers and the number of wires between the physical layers are the same. However, the physical/module layer level of an FF or each gate is considered, and wires between all of gates can be derived from the logic structure in detail with the evaluation expression based on a similar concept.

Figure 8:
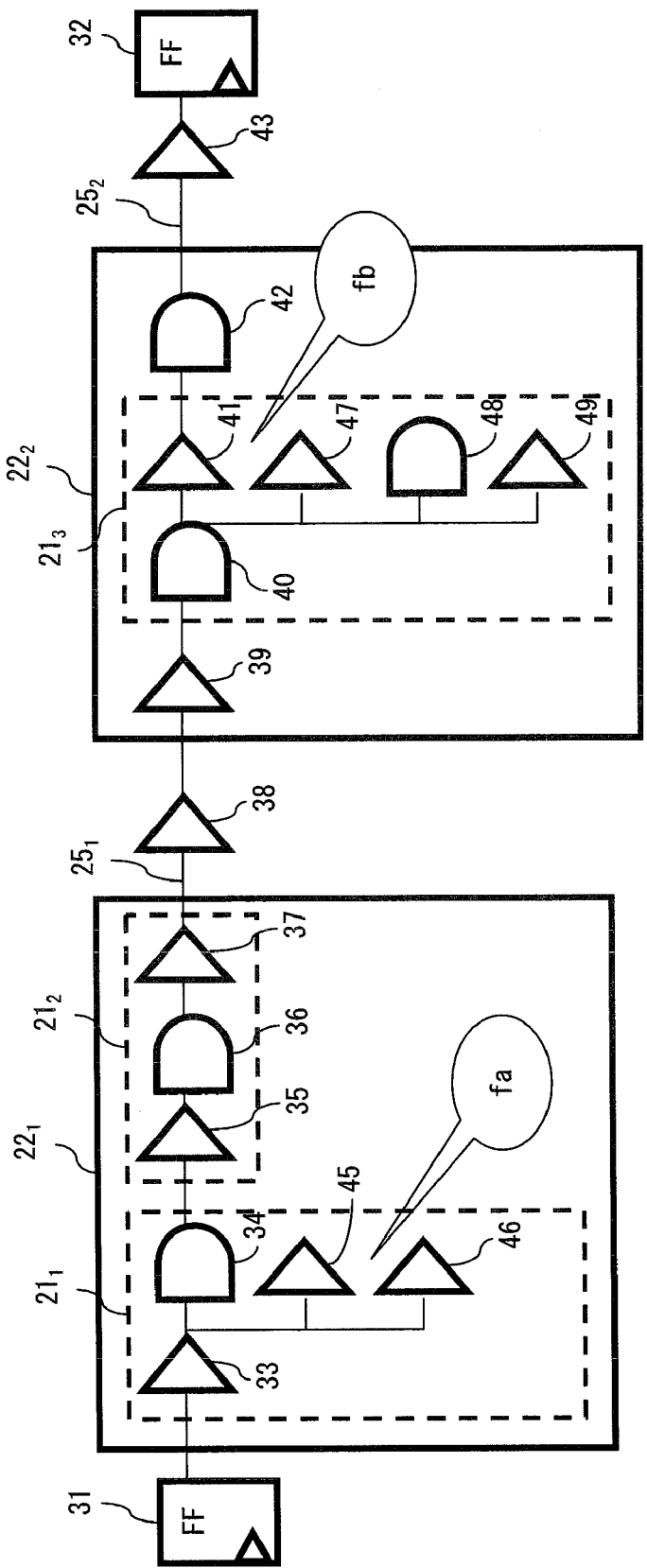
FIG. 8 is a schematic explaining the consideration of the number of fan-outs in a wire-considered logic stage number evaluation value.
Figure 9:
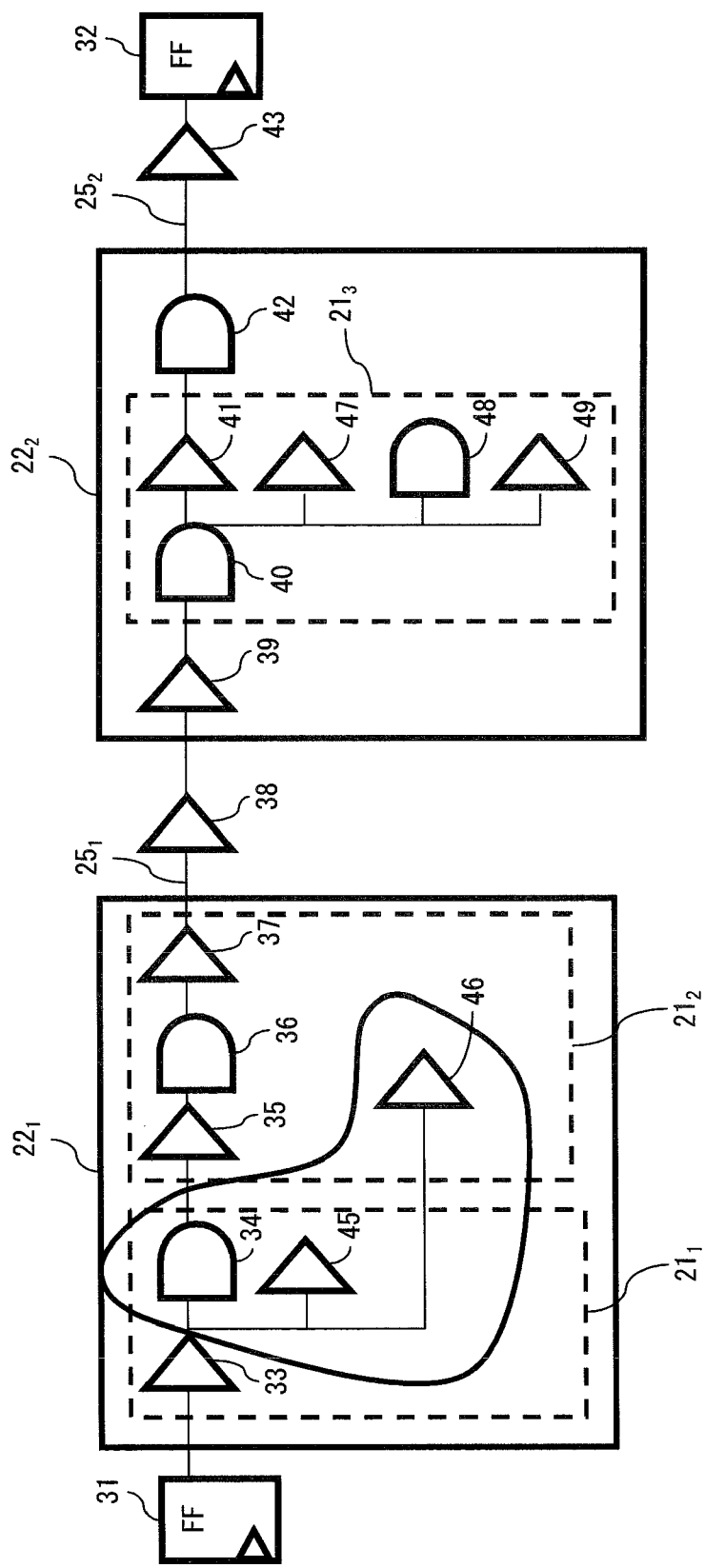
FIG. 9 is a schematic (No. 1) explaining the consideration of positions of gates at fan-out destinations in wire-considered logic stage number evaluation.
Figure 10:
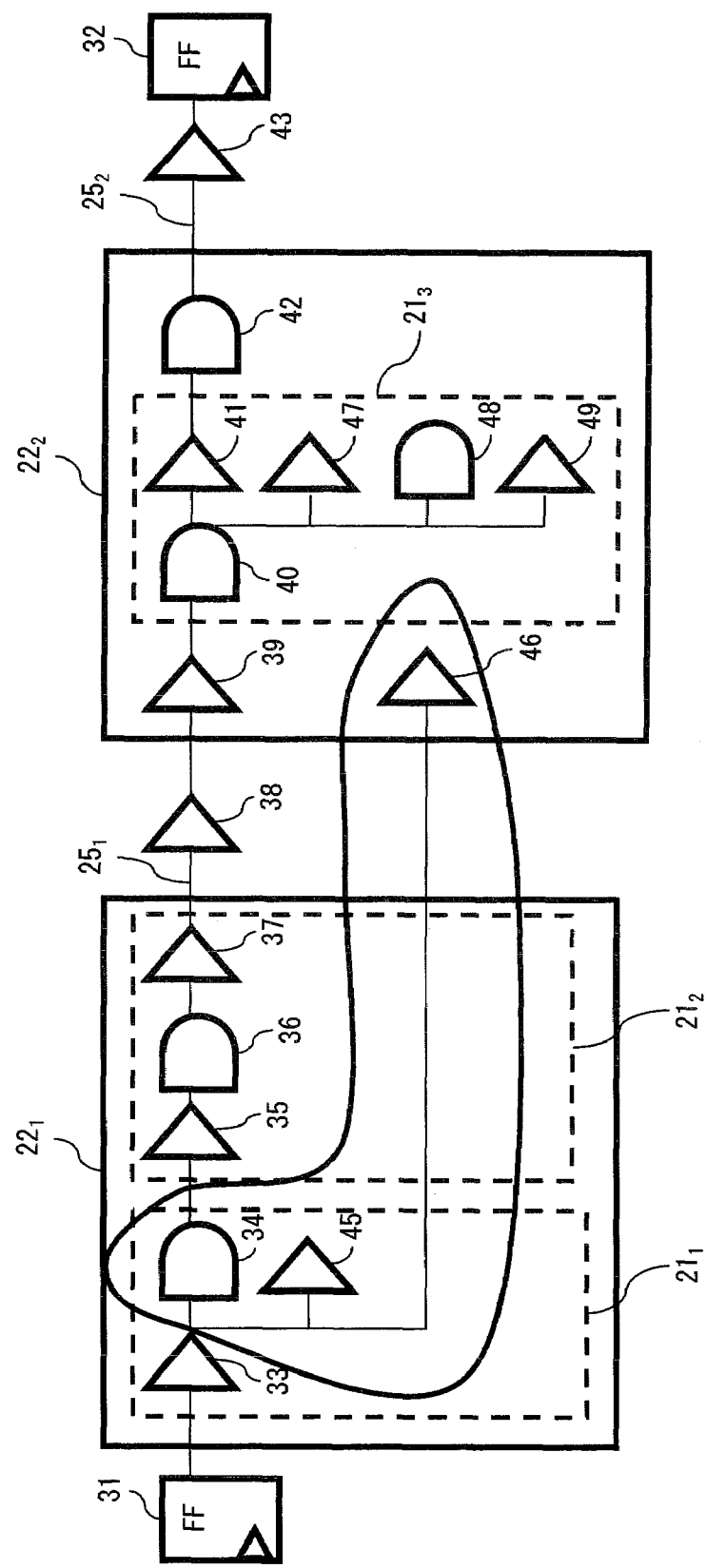
FIG. 10 is a schematic (No. 2) explaining the consideration of positions of gates at fan-out destinations in wire-considered logic stage number evaluation.

FIGS. 8 to 10 explain a calculation method for a wire-considered logic stage number evaluation value by considering the number of fan-outs of a gate included in a path and the positions of fan-out destinations. In FIG. 8, not only a gate 34 but also gates 45 and 46 are added as the fan-out destinations of a gate 33. Additionally, not only a gate 41 but also gates 47, 48, and 49 are added as the fan-out destinations of a gate 40. Assume that the number of fan-outs of the gate 33 and that of fan-outs of the gate 40 are fa (=3) and fb (=4) respectively, and also assume that the wire-considered logic stage number evaluation value in consideration of these numbers of fan-outs is obtained by adding a value resultant from the following expression to the expression (1).

Kfo (fa+fb+...) (2)

where Kfo is a coefficient in conversion into a logic stage number, which corresponds to a wire delay according to the number of fan-outs. Assuming that this value is 0.7, the wire-considered logic stage number evaluation value for FIG. 8 results in 25.1.

FIGS. 9 and 10 explain a calculation method for an evaluation value when gates of fan-out destinations do not exist in the same logic module. In FIG. 9, a gate 46 of the fan-out destinations of the gate 33 exists in a different logic module. Assuming that a coefficient for a fan-out existing in a different logic module is Kfom and its value is 1.1 when fan-out destinations straddle a plurality of logic modules as described above, a wire-considered logic stage number evaluation value for the fan-outs of the gate 33 is 0.7×3=2.1 in FIG. 8, and 2×0.7+1.1=2.5 in FIG. 9.

FIG. 10 shows a case where the gate 46 as a fan-out destination of the gate 33 exists in a different physical layer. Assuming that a coefficient for a fan-out existing in a different physical layer is Kfob and its value is 2.2, a logic stage number evaluation value for the fan-outs of the gate 33 is 2×0.7+2.2=3.6.

Figure 11:
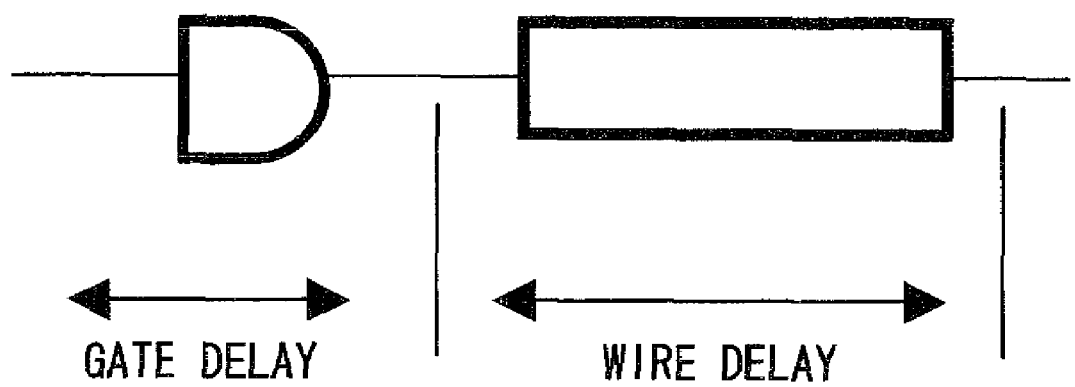
FIG. 11 is a schematic explaining a gate delay and a wire delay for basic gates in one stage.
Figure 12:
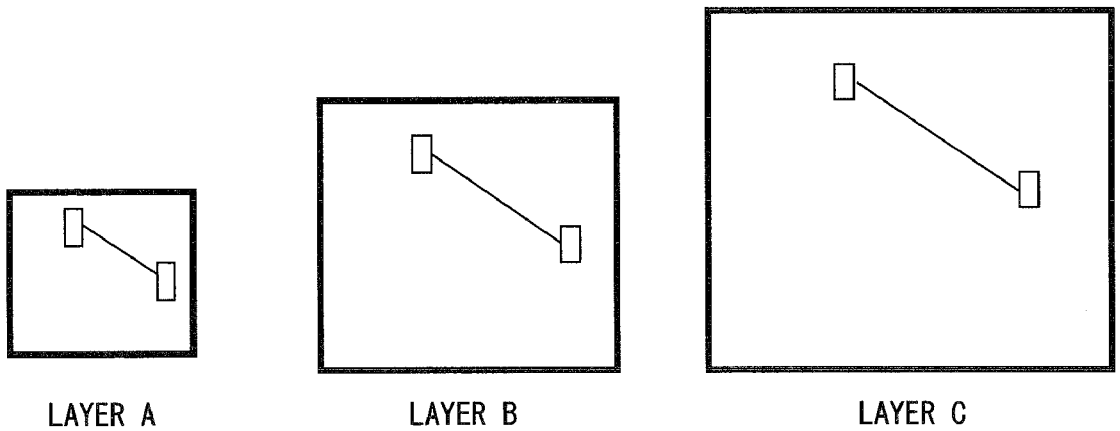
FIG. 12 is a schematic explaining the consideration of physical layer spaces in wire-considered logic stage number evaluation.

In this preferred embodiment, the evaluation of the wire-considered logic stage number evaluation value is assumed to include also the consideration of the space of a logic module or a physical layer, and the frequency of a clock. FIGS. 11 and 12 are schematics explaining a reflection method on the evaluation value of the space of a logic module or a physical layer. FIG. 11 is a schematic explaining a delay per basic gate stage. For example, in FIG. 7, the number of gates itself is used as an evaluation value for a delay of a gate. More strictly, a delay of a gate itself, and a delay of a wire connecting between gates must be considered as a delay of a gate in one stage. In the explanation of FIG. 7, it can be considered that the evaluation value is obtained based on the number of gates by assuming that a delay is constant for each gate including these gate delay and wire delay.

FIG. 12 is a schematic explaining the spaces of, for example, physical layers. Here, three physical layers A, B, and C are shown, and their spaces are assumed to become larger in this order. As the space of a physical layer increases, the number of gates included therein becomes larger as a matter of course, and the length of a wire between gates is considered to be almost identical to that in a physical layer having a small space. On average, however, the length of the wire becomes longer, and an average value of a wire delay per stage is considered to become large in proportion to the space.

Here, if a space where a delay of a basic gate itself in one stage matches the value of an average wire delay between gates is the space of the physical layer B, an evaluation value for another physical layer can be obtained based on this space. For example, if the spaces of the layers B and C are 2500 μm$^2$ and 4000 μm$^2$ respectively, the ratio of the spaces is 1.6. For the sake of simplification, by way of example, for the gates within the physical layer C, a value obtained by multiplying the value of Gate Num in the above described expression (1) by 1.6 can be used as a value equivalent to the number of logic stages of the basic gates within the layer. Here, the reflection of a difference between the spaces on the evaluation value is explained by taking the physical layers as an example. Also the spaces of logic modules can be considered in a similar manner.

FIGS. 13A and 13B explain a reflection method of a difference between clock frequencies on an evaluation value. Assume that a clock having a frequency of 200 MHz and a clock having a frequency of 100 MHz are respectively used in FIGS. 13A and 13B. Also assume that a data transfer is made between the two FFs 31 and 32 in a similar manner as in FIG. 7, and the FF 32 must capture data after one clock from when the FF 31 captures the data. In this case, a data transfer between the FFs is required within 5 ns in FIG. 13A and 10 ns in FIG. 13B.

Accordingly, double of the timing of the data transfer in FIG. 13A is allowed in FIG. 13B. In this preferred embodiment, a difference between the clock frequencies is assumed to be reflected on the wire-considered logic stage number evaluation value with reference to the highest clock frequency used in an LSI to be designed. Accordingly, the wire-considered logic stage number evaluation value for the entire path between the two FFs 31 and 32 in FIG. 13B is one half of the evaluation value calculated for FIG. 13A.

Figure 14:
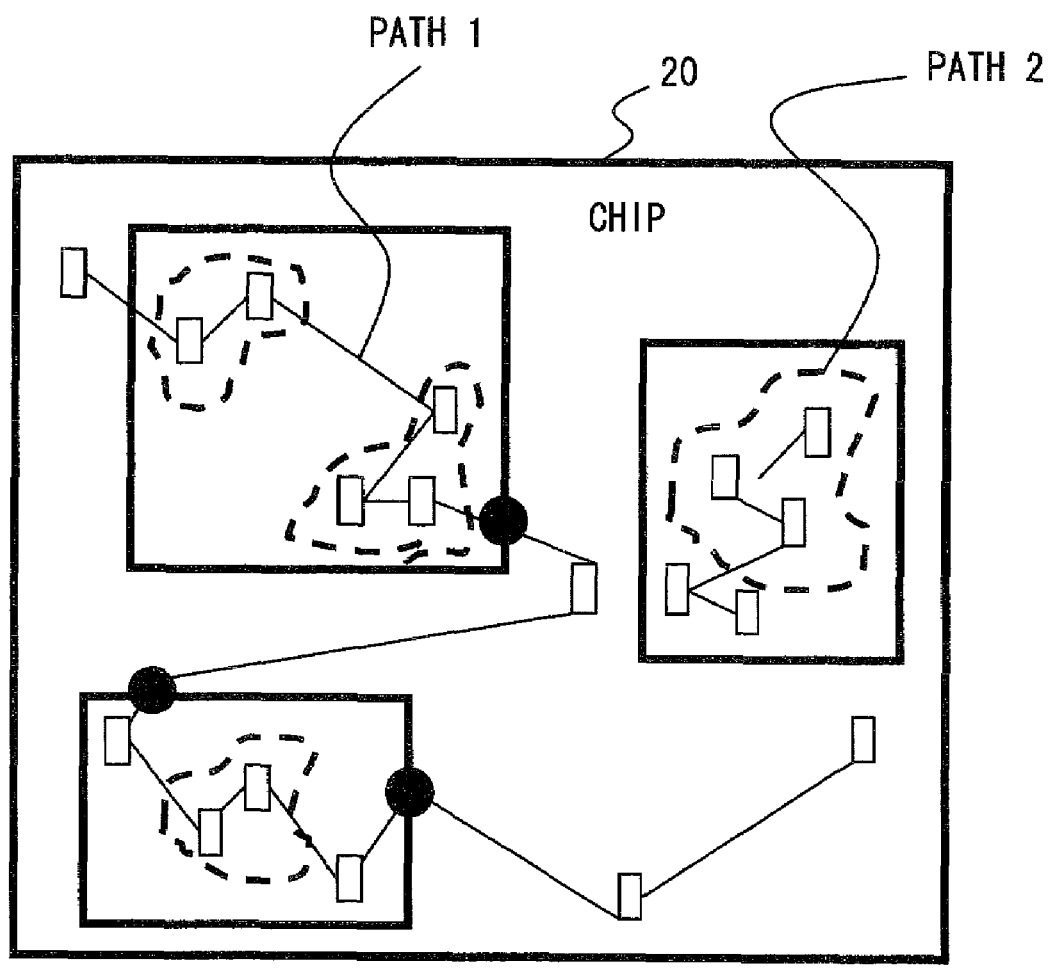
FIG. 14 shows an example of two exception paths on an LSI.

Prioritization of exception paths is described with reference to FIGS. 14 and 15. FIG. 14 shows two paths 1 and 2, which are extracted with the SDC automatic generation tool as exception paths among paths on the chip 20 in the LSI. Here, the paths 1 and 2 are mutually independent. Generally, in STA, all of combinations of arbitrary two memory elements in an LSI are taken as targets of the timing analysis, and timing verification is made for paths between the memory elements. Therefore, either of the paths 1 and 2, which has a larger wire-considered logic stage number evaluation value, is extracted as a critical path candidate in this preferred embodiment.

Figure 15:
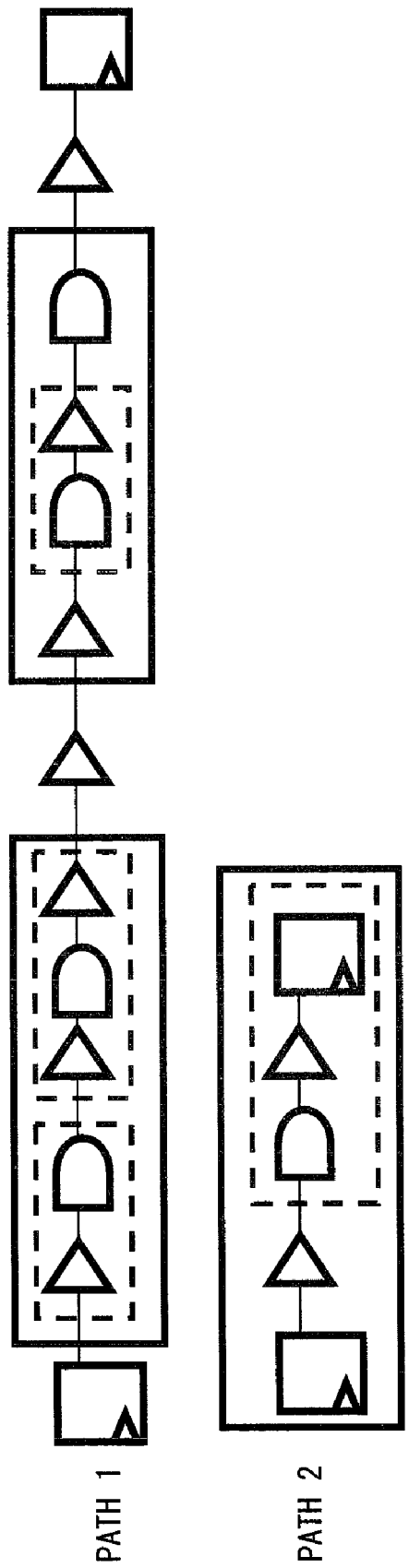
FIG. 15 is a schematic showing the details of the two exception paths in FIG. 14.

FIG. 15 shows the structures of the paths 1 and 2 in FIG. 14. Here, the paths 1 and 2 respectively indicate a data transfer route between two FFs. If their wire-considered logic stage number evaluation values are obtained with the expression (1) in a similar manner as in FIG. 7, the evaluation values for the paths 1 and 2 are 20.2 and 4.2 respectively. Therefore, the priority of the path 1 is higher than that of the path 2 as a critical path candidate.

Up to this point, the critical path estimating program, the estimating apparatus, the estimating method, and the integrated circuit designing program are described in detail. Naturally, this critical path estimating apparatus can be configured based on a general computer system. FIG. 16 is a block diagram showing the configuration of such a computer system, namely, hardware environment.

In FIG. 16, the computer system is configured by a central processing unit (CPU) 60, a read-only memory (ROM) 61, a random access memory (RAM) 62, a communications interface 63, a storage device 64, an input/output device 65, and a reading device 66 of a portable storage medium, which are interconnected by a bus 67.

As the storage device 64, various types of storage devices such as a hard disk, a magnetic disk, etc. can be used. In such a storage device 64 or a ROM 61, the programs represented by the flowcharts shown in FIGS. 3 and 4, the programs recited in claims 1 to 3 of the present invention, and the like are stored. Such programs are executed by the CPU 60, whereby the estimation of a critical path, a layout design using only estimated critical paths as exception paths, and the like in this preferred embodiment can be implemented.

Such programs can be stored, for example, in the storage device 64 from a program provider 68 via a network 69 and the communications interface 63. Or, such programs can be also stored onto a distributed portable storage medium 70, set in the reading device 66, and executed by the CPU 60. As the portable storage medium 70, various types of storage media such as a CD-ROM, a flexible disk, an optical disk, a magneto-optical disk, a DVD, etc. can be used. The programs stored onto such a storage medium are read by the reading device 66, whereby the estimation of a critical path, etc. in this preferred embodiment can be implemented.

According to the above described preferred embodiment, a wire-considered logic stage number evaluation value is obtained by targeting exception paths whose consistency with a logic structure is verified among numerous exception paths extracted with an SDC automatic generation tool, and an exception path having a large evaluation value according to an evaluation value is handled as an exception path in a layout process, whereby the efficiency of the layout process can be increased.

While the wire-considered logic stage number evaluation value is obtained based on the number of logic stages in conversion into basic gates within a path, a wire between logic modules, and a wire between physical layers, also the number of fan-outs of gates within the path, the positions of fan-out destinations, the spaces of logic modules or physical layers, a clock frequency, etc. are considered. As a result, fine prioritization for evaluation values for exception setting paths extracted with an SDC automatic generation tool can be made, and the number of exception paths can be narrowed down to be made available to a layout process. This greatly contributes to an increase in the efficiency of a layout process using extraction results of an SDC automatic generation tool.

What is claimed is:

1. A computer-readable recording medium on which is recorded a program, which is used by a computer for estimating a critical path among a plurality of paths given as paths within an integrated circuit, for causing the computer to execute a process, the process comprising:
   receiving from a memory inputs of a logic description for the integrated circuit, and the plurality of given paths;
   obtaining a path evaluation value, which represents a delay of a path, for each of the given paths; and
   prioritizing the paths according to evaluation values, and estimating a path having a large evaluation value as the critical path;
   wherein the plurality of given paths are paths extracted as exception paths.

2. The computer-readable recording medium according to claim 1, wherein
   in said obtaining the path evaluation value,
   the evaluation value is obtained by using a number of stages of basic gates within a path, and a wire for a logic module configured by a plurality of basic gates arranged in a short distance range within the integrated circuit as delay factors of the path.

3. The computer-readable recording medium according to claim 2, wherein
   in said obtaining the path evaluation value,
   the evaluation value is obtained by using a wire for a physical layer, which is passed by the path, as a scale for which an automatic layout design is made with a process once executed, as a further delay factor of the path.

4. The computer-readable recording medium according to claim 3, wherein
   in said obtaining the path evaluation value,
   the evaluation value is obtained by using a space of the physical layer, which is passed by the path, as a further delay factor of the path.

5. The computer-readable recording medium according to claim 2, wherein
   in said obtaining the path evaluation value,
   the evaluation value is obtained by using a number of fan-outs of a gate included in the path as a further delay factor of the path.

6. The computer-readable recording medium according to claim 2, wherein
   in said obtaining the path evaluation value,
   the evaluation value is obtained by using a position of a gate of a fan-out destination included in the path as a further delay factor of the path.

7. The computer-readable recording medium according to claim 2, wherein
   in said obtaining the path evaluation value,
   the evaluation value is obtained by using a space of the logic module including the path as a further delay factor of the path.

8. The computer-readable recording medium according to claim 2, wherein
   in said obtaining the path evaluation value,
   the evaluation value is obtained by using a frequency of a clock signal corresponding to the path as a further delay factor of the path.

9. The computer-readable recording medium according to claim 1, the process further comprising:
   handling a path, which is estimated as the critical path, among the extracted exception paths as an exception path, and making a layout of the integrated circuit.

10. An apparatus for estimating a critical path among a plurality of paths given as paths within an integrated circuit, comprising:
    an inputting unit for receiving from a memory inputs of a logic description for the integrated circuit, and the plurality of given paths;

an evaluation value calculating unit for obtaining a path evaluation value, which represents a delay of a path, for each of the plurality of given paths; and a prioritizing/processing unit for prioritizing the paths according to evaluation values, and for estimating a path having a large evaluation value as the critical paths;

wherein the plurality of given paths are paths extracted as exception paths.

11. A method for estimating a critical path among a plurality of paths given as paths within an integrated circuit, comprising:

receiving from a memory inputs of a logic description for the integrated circuit, and the plurality of given paths;

obtaining a path evaluation value, which represents a delay of a path, for each of the given paths; and prioritizing the paths according to evaluation values, and estimating a path having a large evaluation value as the critical path;

wherein the plurality of given paths are paths extracted as exception paths.

* * * * *

UNITED STATES PATENT AND TRADEMARK OFFICE
CERTIFICATE OF CORRECTION

| | |
|---|---|
| PATENT NO. | : 7,493,580 B2 |
| APPLICATION NO. | : 11/468900 |
| DATED | : February 17, 2009 |
| INVENTOR(S) | : Keisuke Horita |

It is certified that error appears in the above-identified patent and that said Letters Patent is hereby corrected as shown below:

Column 11, Line 6, change "paths;" to --path;--.

Signed and Sealed this

Twelfth Day of May, 2009

JOHN DOLL
*Acting Director of the United States Patent and Trademark Office*